United States Patent
Ishizeki et al.

(10) Patent No.: US 10,324,234 B2
(45) Date of Patent: Jun. 18, 2019

(54) SUBSTRATE WITH ANTIREFLECTION LAYER

(71) Applicant: AGC Inc., Tokyo (JP)

(72) Inventors: Kenji Ishizeki, Tokyo (JP); Akira Isobe, Tokyo (JP); Yuki Hatanaka, Tokyo (JP); Yohei Kawai, Tokyo (JP); Takashige Yoneda, Tokyo (JP); Keisuke Abe, Tokyo (JP)

(73) Assignee: AGC Inc., Tokyo (JP)

( * ) Notice: Subject to any disclaimer, the term of this patent is extended or adjusted under 35 U.S.C. 154(b) by 648 days.

(21) Appl. No.: 14/878,054

(22) Filed: Oct. 8, 2015

(65) Prior Publication Data

US 2016/0025899 A1    Jan. 28, 2016

Related U.S. Application Data

(63) Continuation of application No. PCT/JP2014/060751, filed on Apr. 15, 2014.

(30) Foreign Application Priority Data

Apr. 24, 2013   (JP) .................................. 2013-091568

(51) Int. Cl.
*G02B 1/111* (2015.01)
*C09D 127/24* (2006.01)
(Continued)

(52) U.S. Cl.
CPC .............. *G02B 1/111* (2013.01); *C01B 33/18* (2013.01); *C03C 17/006* (2013.01); *C03C 17/25* (2013.01);
(Continued)

(58) Field of Classification Search
CPC ... G02B 1/111; G02B 1/113; G02B 2207/107; G02B 27/0006; C09D 5/006;
(Continued)

(56) References Cited

U.S. PATENT DOCUMENTS

| | | |
|---|---|---|
| 5,871,843 A | 2/1999 | Yoneda et al. |
| 6,365,266 B1 | 4/2002 | MacDougall et al. |

(Continued)

FOREIGN PATENT DOCUMENTS

| | | |
|---|---|---|
| JP | 9-314715 | 12/1997 |
| JP | 3668126 | 7/2005 |

(Continued)

OTHER PUBLICATIONS

Machine translation to English JP2009-211078 A. accessed Feb. 6, 2018 (Year: 2009).*

(Continued)

*Primary Examiner* — Nancy R Johnson
(74) *Attorney, Agent, or Firm* — Oblon, McClelland, Maier & Neustadt, L.L.P.

(57) ABSTRACT

The present invention provides a substrate with an antireflection layer not only which is excellent in the antireflection properties but also which has high water repellency and oil repellency and favorable oil and fat stain removability, and a display device provided with a substrate with an antireflection layer.

A substrate with an antireflection layer, which comprises an antireflection layer on at least one surface of the substrate, wherein the antireflection layer contains a silica porous film having fluorinated organic groups, and the surface of the antireflection layer on the opposite side from the substrate has an element number ratio F/Si of at least 1 as obtained from the peak height of $F_{1s}$ and the peak height of $Si_{2p}$ in surface analysis by scanning X-ray photoelectron spectroscopy (ESCA) and has an arithmetic mean roughness (Sa) of at most 3.0 nm.

15 Claims, 1 Drawing Sheet

(51) Int. Cl.
    *C09D 5/00*         (2006.01)
    *C01B 33/18*      (2006.01)
    *C03C 17/00*      (2006.01)
    *C03C 17/25*      (2006.01)
    *G02B 1/18*       (2015.01)
    *C09D 7/40*       (2018.01)
    *G02B 27/00*      (2006.01)
    *B01J 13/18*      (2006.01)

(52) U.S. Cl.
    CPC ............ *C09D 7/40* (2018.01); *C09D 127/24* (2013.01); *G02B 1/18* (2015.01); *B01J 13/18* (2013.01); *C01P 2002/85* (2013.01); *C01P 2004/03* (2013.01); *C01P 2004/64* (2013.01); *C01P 2006/14* (2013.01); *C01P 2006/16* (2013.01); *C01P 2006/60* (2013.01); *C03C 2217/213* (2013.01); *C03C 2217/425* (2013.01); *C03C 2217/732* (2013.01); *C09D 5/006* (2013.01); *G02B 27/0006* (2013.01); *G02B 2207/107* (2013.01)

(58) Field of Classification Search
CPC ... C09D 127/24; C01B 1/113; C01P 2004/64; C01P 2006/14; C01P 2006/16; C01P 2004/03; C01P 2006/60; C01P 2002/85; B01J 13/18
See application file for complete search history.

(56) References Cited

U.S. PATENT DOCUMENTS

| | | |
|---|---|---|
| 6,592,980 B1 | 7/2003 | MacDougall et al. |
| 2002/0102396 A1 | 8/2002 | MacDougall et al. |
| 2003/0157311 A1 | 8/2003 | MacDougall et al. |
| 2005/0195486 A1* | 9/2005 | Sasaki ............... G02B 1/11 359/580 |

FOREIGN PATENT DOCUMENTS

| | | |
|---|---|---|
| JP | 2006-145709 | 6/2006 |
| JP | 2008-139581 | 6/2008 |
| JP | 2009-211078 | 9/2009 |
| JP | 2009211078 A * | 9/2009 |
| JP | 2011-116947 | 6/2011 |

OTHER PUBLICATIONS

International Search Report dated May 27, 2014 in PCT/JP2014/060751 filed Apr. 15, 2014.

* cited by examiner

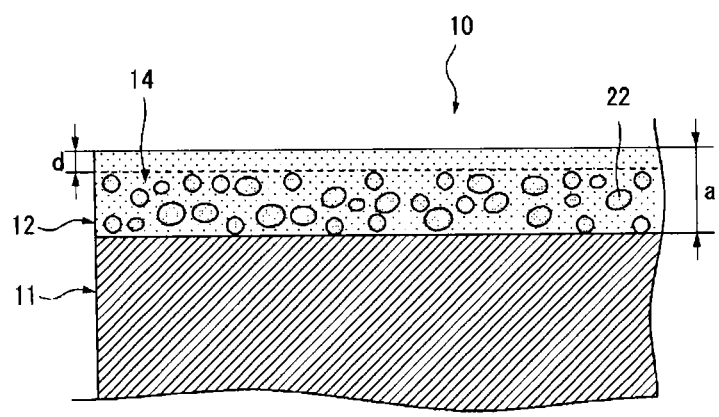

SUBSTRATE WITH ANTIREFLECTION LAYER

CROSS-REFERENCE TO RELATED APPLICATIONS

This application is a Continuation of PCT/JP2014/060751, which was filed on Apr. 15, 2014. This application is based upon and claims the benefit of priority to Japanese Application No. 2013-091568, which was filed on Apr. 24, 2013.

TECHNICAL FIELD

The present invention relates to a substrate with an antireflection layer, a method for producing a substrate with an antireflection layer, and a display device provided with a substrate with an antireflection layer.

BACKGROUND ART

For various display devices such as small-sized displays such as mobile phones and mobile information terminals, large-sized displays such as televisions, and touch panels, cover glass (protective glass) is used in many cases on a front surface of a display member for the purpose of protecting the displays and improving the outer appearance. Further, glass with an antireflection film having an antireflection film against visible light formed on the surface of cover glass has been used in order to improve visibility of an image to be displayed on a display device.

The glass with an antireflection film on a display device is required to have not only high water repellency and oil repellency but also fat and oil stain removability since human hands frequently touch the display device and fat and oil stains such as fingerprints are likely to be attached. Thus, for example, a method of applying an anti-fouling antireflection film containing hollow particles to a transparent substrate of e.g. glass has been proposed (Patent Document 1).

PRIOR ART DOCUMENTS

Patent Documents

Patent Document 1: JP-A-2008-139581

DISCLOSURE OF INVENTION

Technical Problem

According to the present inventors, in the method disclosed in Patent Document 1, it is preferred to lower the refractive index of the antireflection film by increasing the proportion of the hollow particles, whereby excellent antireflection properties will be achieved. However, voids are likely to form among the hollow particles, and irregularities and open pores are likely to form on the surface, and if fat and oil stain is attached, the stain is likely to infiltrate and cannot be wiped up. The antireflection properties will rapidly decrease if the proportion of the matrix component in the antireflection film is increased with a view to improving the smoothness of the antireflection film.

Under these circumstances, the object of the present invention is to provide a substrate with an antireflection layer not only which is excellent in the antireflection properties but also which has excellent water repellency and oil repellency and excellent fat and oil stain removability, a method for producing substrate with an antireflection layer, and a display device provided with a substrate with an antireflection layer.

Solution to Problem

The present invention provides a substrate with an antireflection layer, a method for producing a substrate with an antireflection layer, and a display device provided with a substrate with an antireflection layer, according to the following [1] to [15].

[1] A substrate with an antireflection layer, which comprises an antireflection layer on at least one surface of the substrate,
wherein the antireflection layer contains a silica porous film having fluorinated organic groups, and
the surface of the antireflection layer on the opposite side from the substrate has an element number ratio F/Si of at least 1 as obtained from the peak height of $F_{1s}$ and the peak height of $Si_{2p}$ in surface analysis by scanning X-ray photoelectron spectroscopy (ESCA) and has an arithmetic mean roughness (Sa) of at most 3.0 nm.
[2] The substrate with an antireflection layer according to [1], wherein the antireflection layer has a refractive index of from 1.10 to 1.38.
[3] The substrate with an antireflection layer according to [1] or [2], wherein the antireflection layer has pores having diameters of at least 20 nm, and has a number of open pores of at most 13 pores/$10^6$ $nm^2$ on the opposite surface of the antireflection layer from the substrate.
[4] The substrate with an antireflection layer according to [3], wherein in the antireflection layer, the average of minimum distances from closed pores having diameters of at least 20 nm to the surface of the antireflection layer on the opposite side from the substrate, is from 10 to 80 nm.
[5] The substrate with an antireflection layer according to [3] or [4], wherein in the antireflection layer, the average diameter of the pores is from 15 to 100 nm.
[6] The substrate with an antireflection layer according to any one of [1] to [5], wherein the average of thicknesses of the antireflection layer is from 90 to 260 nm.
[7] The substrate with an antireflection layer according to any one of [1] to [6], wherein the silica porous film has a plurality of pores in a matrix containing silica as the main component.
[8] The substrate with an antireflection layer according to any one of [1] to [7], wherein the antireflection layer has fluorinated organic groups on the surface of the antireflection layer on the opposite side from the substrate.
[9] The substrate with an antireflection layer according to [8], wherein the fluorinated organic groups are groups derived from a compound having a poly(oxyperfluoroalkylene) chain and a hydrolysable silyl group.
[10] The substrate with an antireflection layer according to [9], wherein the compound is a compound represented by the following formula (1):

(1)

Symbols in the formula (1) are as follows:
$R^f$: a poly(oxyperfluoroalkylene) chain,
A: a $C_{1-6}$ perfluoroalkyl group or B,
B: a group represented by the following formula (2):

(2)

Symbols in the formula (2) are as follows:
Q: a bivalent linking group,
L: a hydrolysable group, R: a hydrogen atom or a monovalent hydrocarbon group,
m: an integer of from 1 to 3.

[11] The substrate with an antireflection layer according to any one of [1] to [10], wherein the substrate is a transparent substrate.

[12] A display device provided with the substrate with an antireflection layer as defined in any one of [1] to [11].

[13] A method for producing a substrate with an antireflection layer, which comprises forming a silica porous film on at least one surface of a substrate, and treating the surface of the silica porous film with a compound having a poly(oxyperfluoroalkylene) chain and a hydrolysable silyl group to form an antireflection layer having the above-treated surface which has an element number ratio F/Si of at least 1 as obtained from the peak height of $F_{1s}$ and the peak height of $Si_{2p}$ in surface analysis by scanning X-ray photoelectron spectroscopy (ESCA) and has an arithmetic mean roughness (Sa) of at most 3.0 nm.

[14] The method for producing a substrate with an antireflection layer according to [13], wherein the silica porous film is a film having a plurality of pores in a matrix containing silica as the main component.

[15] The method for producing a substrate with an antireflection layer according to [14], wherein the silica porous film is formed on the substrate by forming a precursor layer containing a matrix precursor (A) containing at least one compound (A1) selected from a compound represented by the following formula (a1), its hydrolysate and partial condensate, and at least one compound (A2) selected from a compound represented by the following formula (a2), its hydrolysate and partial condensate, and particles (B) which can be removed from the matrix by heating, followed by heating:

$$SiX^1_4 \quad\quad\quad\quad (a1)$$

$$Y_nSiX^2_{4-n} \quad\quad\quad\quad (a2)$$

wherein each of $X^1$ and $X^2$ is a hydrolysable group, Y is a non-hydrolysable group, and n is an integer of from 1 to 3.

Advantageous Effects of Invention

According to the present invention, it is possible to provide a substrate with an antireflection layer not only which is excellent in the antireflection properties but also which has excellent water repellency and oil repellency and excellent fat and oil stain removability, a method for producing a substrate with an antireflection layer, and a display device provided with a substrate with an antireflection layer.

BRIEF DESCRIPTION OF DRAWING

FIG. 1 is a cross-sectional view illustrating one embodiment of a substrate with an antireflection layer of the present invention.

DESCRIPTION OF EMBODIMENTS

In this specification, a compound represented by the formula (1) will be referred to as a compound (1). The same applies to compounds represented by other formulae.

In this specification, "a hydrolysable silyl group" means a group capable of forming a silanol group (Si—OH) by hydrolysis. It may, for example, be —Si-$L_mR_{3-m}$ in the formula (1).

In this specification, "a non-hydrolysable group" means a functional group the structure of which does not change under conditions under which a silanol group can be formed by hydrolysis.

In this specification, "a fluorinated organic group" means an organic group containing a fluorine atom bonded to a carbon atom. The organic group is preferably a chain organic group having a carbon chain which may contain a hetero atom such as an etheric oxygen atom between carbon atoms. It may, for example, be a perfluoroalkyl group, a perfluoroalkylene group, a perfluoroalkyl group containing an etheric oxygen atom between carbon atoms, or a poly(oxyperfluoroalkylene) chain.

In this specification, "methyl (meth)acrylate" means both methyl acrylate and methyl methacrylate, and the same applies to other such compounds.

[Substrate with Antireflection Layer]

A substrate 10 with an antireflection layer of the present invention comprises an antireflection layer 12 having fluorinated organic groups (not shown) on at least one surface of a substrate 11 as shown in FIG. 1.

(Substrate)

The substrate in the present invention is preferably a transparent substrate when used for e.g. cover glass of a display device.

In this specification, the transparent substrate may be a substrate having a haze of at most 5% as specified by JIS K-7150, preferably at most 3%, more preferably at most 1%, particularly preferably at most 0.4%.

As a material of the substrate, a metal, a resin, glass, a ceramic or a composite material thereof may be mentioned. As a material of the transparent substrate, glass or a transparent resin is preferred. The glass may, for example, be conventional soda lime glass, alkali aluminosilicate glass, borosilicate glass, alkali-free glass or quartz glass, and is preferably chemically tempered soda lime glass, chemically tempered alkali aluminosilicate glass or chemically tempered borosilicate glass. The transparent resin may, for example, be an acrylic resin such as polymethyl methacrylate, an aromatic polycarbonate resin such as a carbonate of bisphenol A or an aromatic polyester resin such as polyethylene terephthalate (PET).

As the shape of the substrate, the substrate may be a flat plate, or the entire or a part thereof may have a curvature. The size and the thickness of the substrate are not particularly limited and may properly be selected depending upon the purpose of use.

The substrate may be one having its surface subjected to acid treatment (treatment with e.g. diluted hydrochloric acid, sulfuric acid or hydrochloric acid), alkali treatment (treatment with e.g. an aqueous sodium hydroxide solution) or discharge treatment (such as plasma irradiation, corona irradiation or electron beam irradiation). Further, the substrate may have on its surface a functional film formed by e.g. vapor deposition, sputtering or a wet method. The antireflection layer may be formed on the above surface-treated substrate surface or on the surface of the functional film, or may be formed on the surface of the substrate on the opposite side from the surface-treated surface or from the surface on which the functional film is formed.

The substrate has the antireflection layer on at least one surface. The substrate may have the antireflection layer on one surface, or on both surfaces. Further, the substrate may have the antireflection layer on the entire surface or on a part of the surface.

(Antireflection Layer)

The antireflection layer comprises a silica porous film having fluorinated organic groups. In this specification, the silica porous film having fluorinated organic groups is preferably a porous film having a plurality of pores in a matrix containing silica and having fluorinated organic groups on the film surface. By using such a silica porous film having fluorinated organic groups, the antireflection layer is excellent in antireflection properties.

The antireflection layer has an element number ratio F/Si as obtained from the peak height of $F_{1s}$ and the peak height of $Si_{2p}$ of at least 1, preferably from 1 to 50, more preferably from 2 to 50, further preferably from 3 to 30, particularly preferably from 3 to 20, in surface analysis by scanning X-ray photoelectron spectroscopy (ESCA) on the surface on the opposite side from the substrate (hereinafter sometimes referred to simply as "outermost surface"). When the element number ratio F/Si is at least the lower limit of the above range, the surface of the antireflection layer has sufficient water repellency and oil repellency, and when the ratio is at most the upper limit of the above range, the antireflection layer is sufficiently transparent. In this specification, the measurement conditions in the scanning X-ray photoelectron spectroscopy (ESCA) are such that X-ray source: AlKα rays, X-ray output: 25 W, 15 kV.

The antireflection layer has an arithmetic mean roughness (Sa) on the outermost surface of at most 3.0 nm, preferably at most 2.8 nm, particularly preferably at most 2.6 nm. When it is at most the above upper limit, fat and oil stain can readily be removed even if attached. In this specification, the arithmetic mean roughness (Sa) is a value measured by using a scanning probe microscope in a measurement range of 10 μm×10 μm.

The antireflection layer has a refractive index of preferably from 1.10 to 1.38, particularly preferably from 1.15 to 1.35. When the refractive index is at least the lower limit of the above range, a decrease in the durability due to presence of pores will be suppressed. When the refractive index is at most the upper limit of the above range, excellent antireflection properties will be achieved. In this specification, the refractive index is a value measured by an ellipsometer at a wavelength of 589.3 nm.

<Pores in Antireflection Layer>

The antireflection layer of the present invention has pores (FIG. 1), whereby its refractive index is low. The pores are preferably closed pores, whereby the antireflection layer has excellent durability. The antireflection layer has, as the pores, preferably pores having diameters of at least 20 nm, particularly preferably pores having diameters of from 20 to 150 nm, whereby the antireflection layer is excellent in the antireflection properties. In this specification, the diameter of a pore means a value measured from an image of the cross-section of the antireflection layer observed with a scanning electron microscope (hereinafter sometimes referred to as "SEM"). In a case where the pore in the image is not exactly round, the average of the minor axis and the major axis is regarded as the diameter.

At least one, particularly preferably from 2 to 16 pore having diameters of at least 20 nm, are present in a region of 100 nm×100 nm in the image of the cross-section of the antireflection layer observed with a SEM. When one or more such pores are present in a direction of the thickness of the antireflection layer, the antireflection layer has a sufficiently low refractive index, although depending upon the diameters of the pores.

The average of the diameters of the pores (hereinafter sometimes referred to as "average pore diameter") is preferably from 15 to 100 nm, particularly preferably from 20 to 80 nm. When the average pore diameter is at least the lower limit of the above range, the antireflection layer has sufficient antireflection properties, and when it is at most the upper limit of the above range, the antireflection layer has excellent transparency. In this specification, the average pore diameter is an average of diameters of 100 pores in an image of the cross-section of the antireflection layer observed with a SEM. The average pore diameter is an average of diameters of pores having diameters of at least 5 nm, since pores having diameters of at least 5 nm can be measured by the above measurement method.

The antireflection layer has a number of open pores of preferably at most 13 pores/$10^6$ $nm^2$, more preferably at most 10 pores/$10^6$ $nm^2$, particularly preferably 0 pore, on the outermost surface. When the number of open pores on the outermost surface is at most the upper limit of the above range, fat and oil stain is less likely to infiltrate and is easily removed even if attached. In this specification, the number of open pores is the number of open pores present in a region of 1,000 nm×1,000 nm in an image of the outermost surface of the antireflection layer observed with a SEM.

The average of the thicknesses of the antireflection layer (hereinafter referred to as "antireflection layer average thickness", represented by "a" in FIG. 1) is preferably from 40 to 300 nm, particularly preferably from 90 to 260 nm. When the antireflection layer average thickness is at least the lower limit of the above range, interference of light will occur in the visible region, and excellent antireflection properties are likely to be exhibited. When the antireflection layer average thickness is at most the upper limit of the above range, cracking or the like is less likely to occur. In this specification, the antireflection layer average thickness is an average of thicknesses at 100 portions measured in an image of the cross-section of the antireflection layer observed with a SEM.

The average of minimum distances from pores having diameters of at least 20 nm which are closed pores to the outermost surface (hereinafter referred to as "outermost surface average thickness", represented by "d" in FIG. 1) in the antireflection layer is preferably from 10 to 80 nm, particularly preferably from 13 to 60 nm. The minimum distance means the shortest distance among distances from surfaces surrounding a void in a closed pore to the outermost surface of the antireflection layer. When the outermost surface average thickness is at least the lower limit of the above range, it is possible to prevent moisture in the air from reaching the substrate, and when the outermost surface average thickness is at most the upper limit of the above range, the antireflection layer has a low refractive index. In this specification, the outermost surface average thickness is an average of thicknesses at 100 portions in an image of the cross-section of the antireflection layer observed with a SEM.

The ratio of the outermost surface average thickness to the antireflection layer average thickness is not particularly limited and is preferably from 8 to 40%, particularly preferably from 10 to 30%.

<Silica Porous Film>

The antireflection layer contains a silica porous film having fluorinated organic groups. The silica porous film having fluorinated organic groups may be obtained by applying a fluorinated organic compound to a silica porous film to introduce fluorinated organic groups. For example, as described hereinafter, a silica porous film is treated with a fluorinated organic compound to introduce fluorinated organic groups derived from the fluorinated organic compound. Here, the silica porous film means a porous film having a plurality of pores in a matrix containing silica, and is preferably a porous film having a plurality of pores in a matrix containing silica as the main component. By the matrix containing silica as the main component, the antireflection layer has a relatively low refractive index (reflectance), is excellent in the chemical stability and the abrasion resistance and is excellent in the adhesion to a glass plate as the substrate. Specifically, in view of excellent antireflection properties, the refractive index of the antireflection layer is lower than the refractive index of a glass plate of 1.52, and the refractive index of the antireflection layer can is lower than the refractive index of silica of 1.46 due to presence of the pores (refractive index of the air: 1.00) in the matrix.

In this specification, the matrix containing silica as the main component means that the proportion of silica is at least 90 mass % in the matrix (100 mass %). The proportion of silica is more preferably at least 95 mass %, particularly preferably at least 99 mass %. Components other than silica which may be contained in the matrix may be ions and/or a compound such as an oxide of one or more selected from Li, B, C, N, F, Na, Mg, Al, P, S, K, Ca, Ti, V, Cr, Mn, Fe, Co, Ni, Cu, Zn, Ga, Sr, Y, Zr, Nb, Ru, Pd, Ag, In, Sn, Hf, Ta, W, Pt, Au, Bi and lanthanoids.

Further, the matrix may contain nanoparticles. The nanoparticles may be inorganic nanoparticles, and a composition of the inorganic nanoparticles may, for example, be $Al_2O_3$, $SiO_2$, $SnO_2$, $TiO_2$, ZnO or $ZrO_2$. The average particle size of the nanoparticles is preferably less than the antireflection layer average thickness and from 1 to 100 nm. The shape of the nanoparticles is not particularly limited, and spheres, needles, hollow particles, sheets and horn-shaped particles may, for example, be mentioned.

The silica porous film is usually produced by a method of piling inorganic nanoparticles, however, in a silica porous film obtained by such a method, voids among the particles tend to form communicating pores. Whereas, as described hereinafter, a matrix precursor (A) and organic polymer nanoparticles as particles (B) are subjected to heat treatment to form a matrix containing silica from the matrix precursor (A) and at the same time to heat decompose the particles (B) thereby to obtain a silica porous film having pores which are closed pores in its interior, and this silica porous film can be used as the antireflection layer. Hereinafter this method of forming a silica porous film using the particles (B) will be referred to as a firing pore-forming method.

In the present invention, as a means to form a silica porous film, the above firing pore-forming method is preferred. By the firing pore-forming method, it is easy to adjust the arithmetic mean roughness (Sa) to be at most 3.0 nm, and it is also easy to control the number of open pores and the outermost surface average thickness. Further, the size of the particles (B) and the number of the particles (B) in the matrix are easily adjusted, whereby the pore size and the refractive index are also easily controlled.

<Fluorinated Organic Groups in Antireflection Layer>

The antireflection layer has an element number ratio F/Si as obtained from the peak height of $F_{1s}$ and the peak height of $Si_{2p}$ in surface analysis by scanning X-ray photoelectron spectroscopy (ESCA) of at least 1, preferably from 2 to 50, particularly preferably from 3 to 30. When the element number ratio F/Si is at least 1, excellent water repellency and oil repellency will be obtained, and excellent fat and oil stain removability will be obtained.

The element number ratio F/Si may be controlled by introducing fluorinated organic groups by applying a fluorinated organic compound to the above silica porous film. Application of the fluorinated organic compound will be described hereinafter.

The fluorinated organic compound may be a compound having a fluorinated organic group and a hydrolysable silyl group, for example, a compound having a poly(oxyperfluoroalkylene) chain and a hydrolysable silyl group.

The fluorinated organic compound may be a compound (1) represented by the following formula (1):

$$A\text{-}O\text{---}R^f\text{---}B \qquad (1)$$

Symbols in the formula (1) are as follows:
$R^f$: a poly(oxyperfluoroalkylene) chain,
A: a $C_{1-6}$ perfluoroalkyl group or B,
B: a group represented by the following formula (2):

$$\text{-}Q\text{-}Si\text{-}L_mR_{3-m} \qquad (2)$$

Symbols in the formula (2) are as follows:
Q: a bivalent linking group,
L: a hydrolysable group,
R: a hydrogen atom or a monovalent hydrocarbon group,
m: an integer of from 1 to 3.

The compound (1) has a hydrolysable silyl group (—$SiL_mR_{3-m}$) at either one or both of terminals sandwiching a poly(oxyperfluoroalkylene) chain.

$R^f$ in the formula (1) may be a poly(oxyperfluoroalkylene) chain represented by the following formula (3):

$$\text{---}(C_yF_{2y}O)_e\text{---} \qquad (3)$$

Symbols in the formula (3) are as follows:
y: an integer of from 1 to 6 (which may be different in each unit),
e: an integer of from 5 to 100.

That is, the —O—$R^f$— group in the formula (1) may be a group of —O—$(C_yF_{2y}O)_e$—.

$(C_yF_{2y}O)$ may, for example, be $(CF_2O)$, $(CF_2CF_2O)$, $(CF_2CF_2CF_2O)$, $(CF(CF_3)CF_2O)$ or $(CF_2CF_2CF_2CF_2O)$.

Further, in a case were e is 3 or more and the respective $(C_yF_{2y}O)$ units are different two types or more, the order of binding of the different $(C_yF_{2y}O)$ units may be any of alternating, block and random bindings. Particularly preferred is a poly(oxyperfluoroalkylene) chain having different $(C_yF_{2y}O)$ units alternately bound. In such a case, the di(oxyperfluoroalkylene) group having two types of oxyperfluoroalkylene groups bound may be regarded as a repeating unit of the poly(oxyperfluoroalkylene) chain. Such a di(oxyperfluoroalkylene) group may, for example, be $(CF_2CF_2O\text{---}CF_2CF_2CF_2CF_2O)$, $(CF_2CF_2O\text{---}CF_2CF(CF_3)O)$ or $(CF_2CF_2O\text{---}CF_2CF_2CF_2O)$.

In the formula (2), L is a hydrolysable group. L is preferably a group selected from the group consisting of an alkoxy group, an acyloxy group, an alkenyloxy group, an isocyanate group and a halogen atom. L is preferably a $C_{1-10}$ alkoxy group, a $C_{2-10}$ acyloxy group or a $C_{2-10}$ alkenyloxy group. Particularly preferred is a $C_{1-4}$ alkoxy group, whereby an industrial production is easy, gas emission during vapor deposition and wet coating is little, and the compound (1) will be excellent in the storage stability. In a case where a long term stability of the compound (1) is required, an ethoxy group is particularly preferred, and in a case where it is desired to shorten the reaction time after deposition and wet coating, a methoxy group is particularly preferred.

In the formula (2), m is an integer of from 1 to 3, preferably 2 or 3, particularly preferably 3. By the presence of a plurality of L in one molecule, the bonding to the surface of a substrate will be further strengthened. When m is at least 2, a plurality of L present in one molecule may be the same or different from one another. They are preferably the same from the viewpoint of availability of raw material or production efficiency.

In the formula (2), L is a hydrogen atom or a monovalent hydrocarbon group. The monovalent hydrocarbon group may, for example, be an alkyl group, a cycloalkyl group, an alkenyl group or an aryl group. R is preferably a monovalent hydrocarbon group, particularly preferably a monovalent saturated hydrocarbon group. The number of carbon atoms in the monovalent saturated hydrocarbon group is preferably from 1 to 6, more preferably from 1 to 3, particularly preferably from 1 to 2. R is preferably a $C_{1-6}$ alkyl group, more preferably a $C_{1-3}$ alkyl group, particularly preferably a $C_{1-2}$ alkyl group in view of production efficiency.

In the formula (2), the number of R bonded to the silicon atom is 3-m. As described above, m is preferably 2 or 3, particularly preferably 3, and thus the number of R bonded to the silicon atom is preferably 0 or 1, particularly preferably 0. When R in the formula (2) is 0 or 1, the bonding of the silanol group to the surface of the substrate tends to be formed.

In the formula (2), Q is a bivalent linking group, and may be a $C_{2-12}$ bivalent hydrocarbon group which may contain at least one member selected from the group consisting of an amide bond, a urethane bond, an ether bond and an ester bond and/or of which some or all of the hydrogen atoms may be substituted by a fluorine atom.

Q is specifically preferably a bivalent group represented by the following formula (4):

$$-C_fF_{2f}-C_gH_{2g}-D-C_hH_{2h}- \qquad (4)$$

Symbols in the formula (4) are as follows:
f, g, h: an integer of from 0 to 6 (provided that f+g+h=2 to 12),
D: a single bond, an amide bond, a urethane bond, an ether bond or an ester bond.

In a case where each of f, g and h is at least 3, each of $C_fF_{2f}$, $C_gH_{2g}$ and $C_hH_{2h}$ in the formula (4) may be linear or branched, and is preferably linear, whereby excellent fat and oil stain removability will be obtained.

The compound (1) may be obtained in such a manner that a compound having polyoxyalkylene units as repeating units as a material is fluorinated and then reacted with a lower alcohol, and as the case requires, the reaction product is reduced and an ethylenic unsaturated bond is formed on one terminal, and then the resulting compound is reacted with a hydrolysable group-containing silane compound having a reactive group.

Further, as described in the after-mentioned Examples, the compound (1) may be synthesized by the following method. By the following method, the compound (1) having a poly(oxyperfluoroalkylene) chain having different $(C_yF_{2y}O)$ units alternately bound may be synthesized.

As a material, a fluorinated compound having $CF_2=CF-O-$ and a carboxy group or a group capable of being converted to a carboxy group at its terminal is prepared and reduced to synthesize a compound having $CF_2=CF-O-$ and a hydroxy group, which is polymerized in the presence of an alcohol or a fluorinated alcohol to form a compound having as repeating units di(fluorooxyalkylene) groups each having a fluorooxyalkylene unit and another fluorooxyalkylene unit bound. Then, the obtained compound is fluorinated to obtain a perfluorinated compound, which is further reacted with a lower alcohol, and as the case requires, the resulting reaction product is reduced and an ethylenic unsaturated bond is formed to one terminal, and the resulting compound is reacted with a hydrolysable group-containing silane compound having a reactive group to obtain the compound (1).

As the compound (1), for example, the following may be mentioned.

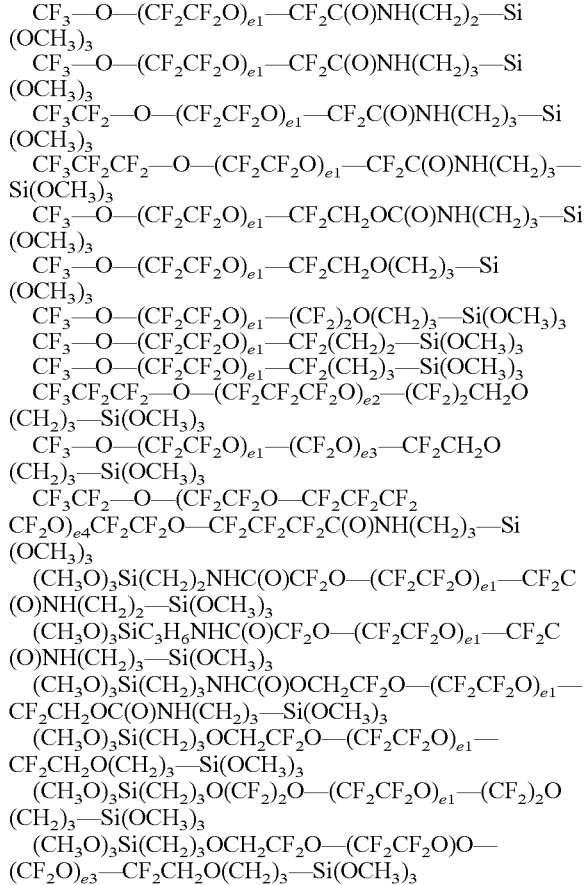

$CF_3-O-(CF_2CF_2O)_{e1}-CF_2C(O)NH(CH_2)_2-Si(OCH_3)_3$
$CF_3-O-(CF_2CF_2O)_{e1}-CF_2C(O)NH(CH_2)_3-Si(OCH_3)_3$
$CF_3CF_2-O-(CF_2CF_2O)_{e1}-CF_2C(O)NH(CH_2)_3-Si(OCH_3)_3$
$CF_3CF_2CF_2-O-(CF_2CF_2O)_{e1}-CF_2C(O)NH(CH_2)_3-Si(OCH_3)_3$
$CF_3-O-(CF_2CF_2O)_{e1}-CF_2CH_2OC(O)NH(CH_2)_3-Si(OCH_3)_3$
$CF_3-O-(CF_2CF_2O)_{e1}-CF_2CH_2O(CH_2)_3-Si(OCH_3)_3$
$CF_3-O-(CF_2CF_2O)_{e1}-(CF_2)_2O(CH_2)_3-Si(OCH_3)_3$
$CF_3-O-(CF_2CF_2O)_{e1}-CF_2(CH_2)_2-Si(OCH_3)_3$
$CF_3-O-(CF_2CF_2O)_{e1}-CF_2(CH_2)_3-Si(OCH_3)_3$
$CF_3CF_2CF_2-O-(CF_2CF_2CF_2O)_{e2}-(CF_2)_2CH_2O(CH_2)_3-Si(OCH_3)_3$
$CF_3-O-(CF_2CF_2O)_{e1}-(CF_2O)_{e3}-CF_2CH_2O(CH_2)_3-Si(OCH_3)_3$
$CF_3CF_2-O-(CF_2CF_2O-CF_2CF_2CF_2CF_2O)_{e4}CF_2CF_2O-CF_2CF_2CF_2C(O)NH(CH_2)_3-Si(OCH_3)_3$
$(CH_3O)_3Si(CH_2)_2NHC(O)CF_2O-(CF_2CF_2O)_{e1}-CF_2C(O)NH(CH_2)_2-Si(OCH_3)_3$
$(CH_3O)_3SiC_3H_6NHC(O)CF_2O-(CF_2CF_2O)_{e1}-CF_2C(O)NH(CH_2)_3-Si(OCH_3)_3$
$(CH_3O)_3Si(CH_2)_3NHC(O)OCH_2CF_2O-(CF_2CF_2O)_{e1}-CF_2CH_2OC(O)NH(CH_2)_3-Si(OCH_3)_3$
$(CH_3O)_3Si(CH_2)_3OCH_2CF_2O-(CF_2CF_2O)_{e1}-CF_2CH_2O(CH_2)_3-Si(OCH_3)_3$
$(CH_3O)_3Si(CH_2)_3O(CF_2)_2O-(CF_2CF_2O)_{e1}-(CF_2)_2O(CH_2)_3-Si(OCH_3)_3$
$(CH_3O)_3Si(CH_2)_3OCH_2CF_2O-(CF_2CF_2O)O-(CF_2O)_{e3}-CF_2CH_2O(CH_2)_3-Si(OCH_3)_3$

In the above chemical formulae, e1 to e4 are integers within the above range of e.

As the compound (1), commercial products may be used, such as Optool DSX and Optool AES (manufactured by DAIKIN INDUSTRIES, LTD.) and DOW CORNING 2634 COATING (manufactured by Dow Corning Toray Co., Ltd.). Further, the fluorooxyalkylene group-containing polymer composition as disclosed in JPA-2011-116947 may also be used.

(Production of Substrate with Antireflection Layer)

The substrate with an antireflection layer may be produced by a known method. It is preferably produced by the above firing pore-forming method as follows, whereby a substrate with an antireflection layer not only which is excellent in the antireflection properties but also which has high water repellency and oil repellency and favorable fat and oil stain removability can be produced.

A coating liquid containing a matrix precursor (A), particles (B) which can be removed from the matrix by heating and a liquid medium (C) is applied to the surface of a substrate and heated to form a silica porous film on the substrate, and then a fluorinated organic compound is applied to introduce fluorinated organic groups.

<Formation of Silica Porous Film on Substrate>

In the firing pore-forming method, silica as the matrix is formed by a sol-gel method. In the sol-gel method, as a silica material, a tetrafunctional hydrolysable silane such as a tetraalkoxysilane is usually used. However, in the present invention, it is preferred to use a monofunctional to trifunctional hydrolysable silane in combination with the tetrafunctional hydrolysable silane. By use of a monofunctional to trifunctional hydrolysable silane in combination, silica is finally formed by two step reaction consisting of hydrolytic polycondensation of the hydrolysable silane and decomposition and disappearance of the organic group bonded to the silicon atom. It is considered that the formation of silica and formation of pores by decomposition and disappearance of the particles (B) are coupled with each other, silica formation reaction proceeds even after the pore formation, smoothing of the surface of the forming silica porous film proceeds, and the arithmetic mean roughness (Sa) on the surface and the number of open pores are reduced. Further, it is considered that the pores tend to be closed pores, the outermost surface average thickness tends to be large, and the strength of the film is increased.

In formation of the silica porous film in the present invention, the matrix precursor (A) contains at least one compound (A1) selected from a compound represented by the following formula (a1) which is a tetrafunctional hydrolysable silane, its hydrolysate and partial condensate, and at least one compound (A2) selected from a compound represented by the following formula (a2) which is a monofunctional to trifunctional hydrolysable silane and its hydrolysate and partial condensate:

  (a1)

  (a2)

wherein each of $X^1$ and $X^2$ is a hydrolysable group, Y is a non-hydrolysable group, and n is an integer of from 1 to 3.

In the formula (a1), $X^1$ may be the same group as the above-described L. It is particularly preferably an alkoxy group, whereby handling in the air is easy and the hydrolytic polycondensation reaction is easily controlled. The alkoxy group is preferably a $C_{1-4}$ alkoxy group, particularly preferably a methoxy group or an ethoxy group. A plurality of $X^1$ present in one molecule may be the same or different from one another. They are preferably the same from the viewpoint of availability, controllability of the hydrolytic polycondensation reaction, etc.

The compound (a1)) may, for example, be specifically a tetraalkoxysilane (such as tetramethoxysilane, tetraethoxysilane, tetrapropoxysilane or tetrabutoxysilane), preferably tetramethoxysilane or tetraethoxysilane. They may be used alone or in combination of two or more.

The hydrolysate or partial condensate of the compound (a1) may be obtained by a conventional method. The hydrolysate or partial condensate may be obtained by mixing the compound (a1)) with water.

In the formula (a2), n is preferably 1 or 2, particularly preferably 1.

As examples and preferred examples of the hydrolysable group as $X^2$, the same groups as those for $X^1$ may be mentioned. A plurality of $X^2$ present in one molecule may be the same or different from one another. They are preferably the same in view of availability, controllability of the hydrolysis, etc.

In the formula (a2), Y may be a perfluoropolyether group, a perfluoroalkyl group, an alkyl group or an aryl group (such as a phenyl group), preferably an aryl group (particularly a phenyl group) in that after heating, it tends to leave the compound to form silanol groups on the surface of the silica porous film, and groups derived from the fluorinated organic compound are efficiently introduced, and in that a relatively high temperature is required in decomposition and disappearance at the time of firing and disappearance takes relatively long. It is considered that by Y which is an organic group bonded to the silicon atom being an organic group which is relatively unlikely to disappear, formation of pores by disappearance of the particles (B) proceeds before disappearance of Y, and smoothening of the film by the silica formation reaction after formation of pores sufficiently proceeds.

The compound (a2) may, for example, be specifically a monoalkyl trialkoxysilane (such as methyltrimethoxysilane), a monoaryl trialkoxysilane (such as phenyl trimethoxysilane or phenyl triethoxysilane), a diaryl dialkoxysilane (such as diphenyldimethoxysilane or diphenyldiethoxysilane), a triaryl monoalkoxysilane (such as triphenyl methoxysilane or triphenyl ethoxysilane). Among them, preferred is a monoalkyl trialkoxysilane or a monoaryl trialkoxysilane, particularly preferred is a monoaryl trialkoxysilane in view of availability and in that an inert gas is not formed at the time of heat decomposition. They may be used alone or in combination of two or more.

The hydrolysate and partial condensate of the compound (a2) may be obtained by the same method as the hydrolysate and partial condensate of the compound (a1). Further, the compounds (a1) and (a2) may be preliminarily mixed and co-hydrolytic polycondensation reaction is carried out.

The content ratio of the compound (A1) to the compound (A2) in the matrix precursor (A) is preferably from 0.1 to 3.0, particularly preferably from 0.2 to 2.0 as calculated as the molar ratio ((a1)/(a2)) of the compound (a1) to the compound (a2). When this ratio is at least the lower limit, hydrolytic polycondensation will sufficiently proceed, and if the ratio is less than the lower limit, the amount of Y which is an organic group bonded to the silicon atom tends to be large, and its disappearance may be insufficient. On the other hand, if this ratio exceeds the upper limit, the amount of Y tends to be small, the reaction in the latter step in the two-step silica formation reaction tends to be short, and disappearance of the particles (B) may be insufficient. Further, when the ratio is at most the upper limit, smoothing of the film surface will sufficiently proceed, the refractive index is sufficiently low, and the strength of the film will improve.

The content of the matrix precursor (A) in the coating liquid is not particularly limited so long as the coating liquid can be applied, and is preferably from 0.2 to 20 mass %, particularly preferably from 0.5 to 15 mass % as the solid content concentration as calculated as $SiO_2$ based on the total amount (100 mass %) of the coating liquid. When it is at least the lower limit of the above range, the hydrolytic polycondensation reaction will sufficiently proceed, and when it is at most the upper limit of the above range, the hydrolytic polycondensation reaction will easily be controlled, and the coating liquid will be excellent in the long term storage property. The solid content as calculated as $SiO_2$ is a solid content assuming that the entire Si in the matrix precursor (A) contained in the coating liquid is converted to $SiO_2$.

The particles (B) in the present invention may be particles made of a heat decomposable material or a heat sublimable material. The heat decomposition temperature of the heat decomposable material is preferably from 100 to 800° C., particularly preferably from 200 to 700° C. The heat decomposable material may, for example, be carbon, an organic polymer or surfactant micelles. Among them, in view of the stability with time, carbon or an organic polymer is preferred, and an organic polymer is particularly preferred. The heat decomposition temperature of an organic polymer in the air varies depending upon the type and the molecular weight of the organic polymer and is usually at a level of from 200 to 600° C. The heat decomposition temperature of an organic polymer may be measured by differential thermogravimetric analysis (TG-OTA).

The organic polymer is not particularly limited so long as nanoparticles having a desired particle size can be synthesized, and is preferably a homopolymer or copolymer of a monomer selected from the group consisting of a (meth)acrylic monomer, a styrene monomer, a diene monomer, an imide monomer and an amide monomer (hereinafter sometimes referred to as "a specific monomer group"), and the monomer as the material of the polymer is particularly preferably an acrylic monomer.

The acrylic monomer may, for example, be methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, dodecyl (meth)acrylate, phenyl (meth)acrylate, methoxyethyl (meth)acrylate, ethoxyethyl (meth)acrylate, propoxyethyl (meth)acrylate, butoxyethyl (meth)acrylate, ethoxypropyl (meth)acrylate, diethylaminoethyl (meth)acrylate, dialkylaminoalkyl (meth)acrylate, (meth)acrylamide, N-methylol (meth)acrylamide, diacetone acrylamide, glycidyl (meth)acrylate, a diacrylic acid ester of ethylene glycol, a diacrylic acid ester of diethylene glycol, a diacrylic acid ester of triethylene glycol, a diacrylic acid ester of polyethylene glycol, a diacrylic acid ester of dipropylene glycol, a diacrylic acid ester of tripropylene glycol, a dimethacrylic acid ester of ethylene glycol, a dimethacrylic acid ester of diethylene glycol, a dimethacrylic acid ester of triethylene glycol, a dimethacrylic acid ester of polyethylene glycol, a dimethacrylic acid ester of propylene glycol, a dimethacrylic acid ester of dipropylene glycol and a dimethacrylic acid ester of tripropylene glycol.

The organic polymer is preferably poly(methyl methacrylate) (PMMA) or polystyrene (PS), particularly preferably PMMA.

The heat decomposition temperature of the homopolymer or copolymer is preferably from 200 to 600° C., particularly preferably from 300 to 500° C.

As the particles of the organic polymer, a commercial product may be used, or particles produced by a known process for producing organic polymer nanoparticles may be used. For example, a dispersion having organic polymer nanoparticles dispersed may be obtained by a known emulsion polymerization method. Specifically, a monomer is added to water containing a surfactant and mixed to form micelles, and a polymerization initiator is added to carry out polymerization thereby to obtain an aqueous dispersion of organic polymer nanoparticles. Otherwise, organic polymer nanoparticles obtained by a soap-free polymerization method using no surfactant may be used.

The average primary particle size of the particles (B) is preferably from 20 to 130 nm, more preferably from 30 to 100 nm. When the average primary particle size of the particles (B) is at least the lower limit of the above range, a silica porous film having pores having diameters of at least 20 nm can be formed, and when it is at most the upper limit of the above range, the number of open pores on the outermost surface is adjusted to be at most 13 pores/$10^6$ nm. Further, the average pore diameter tends to be from 15 to 100 nm.

The average primary particle size in this specification is an average of particle sizes of 100 particles randomly selected from an image observed with a transmission electron microscope.

As the particles (B), a single type of particles may be used alone, or two or more types of particles differing in the material, the average primary particle size or the like may be used in combination.

The content of the particles (B) in the coating liquid is such that the mass ratio ((A)/(B)) of the content of the matrix precursor (A) as calculated as $SiO_2$ to the content of the particles (B) is preferably from 0.3 to 4.0, particularly preferably from 0.5 to 3.0. When the (A)/(B) ratio is at least the lower limit of the above range, the silica porous film will be excellent in the durability. When the ratio is at most the upper limit of the above range, the refractive index of the silica porous film tends to be sufficiently low (for example, at most 1.38).

The liquid medium (C) in the present invention is a liquid in which the matrix (A) is dissolved and in which the particles (B) are dispersed, and may be a single liquid or a mixture of two or more liquids. The liquid medium (C) preferably contains at least water, since water is necessary for hydrolysis of the compounds (a1) and (a2).

Water and another liquid may be used in combination. Such another liquid may, for example, be an alcohol (such as methanol, ethanol, isopropanol, butanol or diacetone alcohol), a ketone (such as acetone, methyl ethyl ketone or ethyl isobutyl ketone), an ether (such as tetrahydrofuran or 1,4-dioxane), a cellosolve (such as methyl cellosolve or ethyl cellosolve), an ester (such as methyl acetate or ethyl acetate), a glycol ether (such as ethylene glycol monoalkyl ether), a nitrogen-containing compound (such as N,N-dimethylacetamide, N,N-dimethylformamide or N-methylpyrrolidone) or a sulfur-containing compound (such as dimethylsulfoxide).

The content of the liquid medium (C) in the present invention is preferably from 90.0 to 99.5 mass %, particularly preferably from 95.0 to 99.0 mass % based on the coating liquid.

The coating liquid may contain another component other than the matrix precursor (A), the particles (B) and the liquid medium (C) within a range not to impair the effects of the present invention.

Such another component may, for example, be a curing catalyst (such as a metal chelate, a metal alcoholate or organic tin) to improve the reactivity of the matrix precursor (A).

As a method for preparing the coating liquid, a method of mixing the matrix precursor (A), the particles (B), another component and the liquid medium (C) or a method of preliminarily mixing part of them may be mentioned. A method of mixing a solution of the matrix precursor (A) (hereinafter sometimes referred to as "matrix precursor solution") and a dispersion of the particles (B) (hereinafter sometimes referred to as "particle dispersion") may be mentioned, whereby excellent water repellency and oil repellency and excellent fat and oil stain removability are achieved. In such a case, the liquid medium (C) is a mixture of a liquid medium in the matrix precursor solution and a liquid medium in the particle dispersion. In a case where the coating liquid contains another component, it is preferred that said another component is added to the matrix precursor solution and the solution is mixed with the particle dispersion, whereby the particles (B) are easily dispersed and the dispersed state can stably be maintained.

The matrix precursor (A) solution is a solution of the matrix precursor (A) in a liquid medium. The liquid medium is preferably a mixture of water and an alcohol, and the alcohol is particularly preferably methanol or ethanol.

The particle dispersion is a dispersion of the particles (B) in a liquid medium, and the liquid medium is preferably an alcohol, a ketone, an ether, a cellosolve, an ester, a glycol ether, a nitrogen-containing compound or a sulfur-containing compound.

To apply the coating liquid in the present invention, a known method may be employed, such as a wet coating method (such as a spin coating method, a spray coating method, a dip coating method, a die coating method, a curtain coating method, a screen coating method, an ink jet method, a flow coating method, a gravure coating method, a bar coating method, a flexographic coating method, a slit coating method, a roll coating method or a sponge coating method). The coating temperature is preferably from 10 to 100° C., particularly preferably from 20 to 80° C.

A layer of the coating liquid is formed on a substrate, and the liquid medium (C) is removed, whereby a layer of a solid containing the matrix precursor (A) and the particles (B) (hereinafter sometimes referred to as "a precursor layer") is formed. Usually, the liquid medium (C) is removed by heating the layer of the coating liquid to evaporate and remove the liquid medium (C) (hereinafter sometimes referred to as "drying"). Further, it is considered that at the time of this heating, hydrolysis reaction and condensation reaction of the matrix precursor (A) proceed. Accordingly, it is considered that the matrix precursor (A) in the precursor layer and the matrix precursor (A) in the coating liquid are different from each other in the degree of the hydrolytic polycondensation reaction.

Subsequently to the formation of the precursor layer, it is further heated to high temperature to convert the matrix precursor (A) to silica and to heat decompose the particles (B) to form pores, thereby to form a silica porous film on the substrate.

Heating to evaporate and remove the liquid medium (C) and subsequent heating to form the silica porous film may be carried out continuously while the heat temperature is changed or may be carried out stepwise. Further, heating mainly to form silica and heating mainly to heat decompose the particles (B) may be carried out continuously or stepwise while the heat temperature is changed or may be carried out at a constant temperature.

The heat temperature at the time of heating to convert the matrix precursor (A) to silica and to convert the particles (B) to pores, may be properly determined depending upon the substrate, the matrix precursor (A) and the particles (B). In a case where the particles (B) are composed of a heat decomposable material such as carbon or an organic polymer and the particles (B) are removed by heating, the particles (B) can be removed by a heat treatment at a temperature of at least the heat decomposition temperature of the heat decomposable material. The heat treatment temperature in such a case is preferably at least (heat decomposition temperature+100° C.), particularly preferably at least (heat decomposition temperature+50° C.). The heating time is not particularly limited so long as the particles (B) can be converted to pores, and is preferably from 1 to 60 minutes.

The silica porous film thus obtained has an arithmetic mean roughness (Sa) on the outermost surface of at most 3.0 nm, preferably at most 2.8 nm, particularly preferably at most 2.6 nm. Further, the water contact angle on the outermost surface is preferably at least 100°, particularly preferably at least 110°, whereby the fluorinated organic compound is easily applied.

Introduction of fluorinated organic groups to the silica porous film may be carried out by applying a fluorinated organic compound, and as an application method, a method of treating the surface of the silica porous film with a fluorinated organic compound by dry coating (dry coating method) or a method of applying a coating fluid containing a fluorinated organic compound to the surface of the silica porous film and drying the coating fluid (wet coating method) may be mentioned.

As a dry coating method, a known method may be employed, such as vacuum decomposition, CVD or sputtering.

The coating fluid in the wet coating method (hereinafter referred to as "coating fluid") contains the fluorinated organic compound and a liquid medium. The coating fluid may be a solution or a dispersion so long as it is in a liquid state. The content of the fluorinated organic compound in the coating fluid is preferably from 0.001 to 10 mass %, particularly preferably from 0.1 to 1 mass %.

The liquid medium in the coating fluid is preferably an organic solvent, and the organic solvent may be a fluorinated organic solvent or a non-fluorinated organic solvent, or a combination thereof.

The fluorinated organic solvent may, for example, be a fluorinated alkane, a fluorinated aromatic compound, a fluoroalkyl ether, a fluorinated alkylamine or a fluoroalcohol.

The fluorinated alkane is preferably a $C_{4-8}$ compound. As commercial products, for example, $C_6F_{13}H$ (AC-2000, tradename, manufactured by Asahi Glass Company, Limited), $C_6F_{13}C_2H_5$ (AC-6000, tradename, manufactured by Asahi Glass Company, Limited) and $C_2F_5CHFCHFCF_3$ (Vertrel, tradename, manufactured by Du Pont Kabushiki Kaisha) may, for example, be mentioned.

The fluorinated aromatic compound may, for example, be hexafluorobenzene, trifluoromethylbenzene, perfluorotoluene or bis(trifluoromethyl)benzene.

The fluoroalkyl ether is preferably a $C_{4-12}$ compound. As commercial products, for example, $CF_3CH_2OCF_2CF_2H$ (AE-3000, tradename, manufactured by Asahi Glass Company, Limited), $C_4F_9OCH_3$ (Novec-7100, tradename, manufactured by Sumitomo 3M Limited), $C_4F_9OC_2H_5$ (Novec-7200, tradename, manufactured by Sumitomo 3M Limited) and $C_6F_{13}OCH_3$ (Novec-7300, tradename, manufactured by Sumitomo 3M Limited) may, for example, be mentioned.

The fluorinated alkylamine may, for example, be perfluorotripropylamine or perfluorotributylamine.

The fluoroalcohol may, for example, be 2,2,3,3-tetrafluoropropanol, 2,2,2-trifluoroethanol or hexafluoroisopropanol.

The fluorinated organic solvent is preferably a fluorinated alkane, a fluorinated aromatic compound or a fluoroalkyl ether in view of the solubility of the fluorinated organic compound, and is particularly preferably a fluoroalkyl ether.

The non-fluorinated organic solvent may be a hydrocarbon compound or a compound composed of hydrogen atoms, carbon atoms and oxygen atoms, such as a hydrocarbon organic solvent, an alcohol organic solvent, a ketone organic solvent, an ether organic solvent or an ester organic solvent.

The hydrocarbon organic solvent may, for example, be hexane, heptane or cyclohexane.

The alcohol organic solvent may, for example, be methanol, ethanol, propanol or isopropanol.

The ketone organic solvent may, for example, be acetone, methyl ethyl ketone or methyl isobutyl ketone.

The ether organic solvent may, for example, be diethyl ether, tetrahydrofuran or tetraethylene glycol dimethyl ether.

The ester organic solvent may, for example, be ethyl acetate or butyl acetate.

The non-fluorinated organic solvent is preferably a ketone organic solvent in view of the solubility of the fluorinated organic compound.

The liquid medium is preferably at least one member selected from the group consisting of the fluorinated alkane, the fluorinated aromatic compound, the fluoroalkyl ether, the hydrocarbon compound and the compound composed of hydrogen atoms, carbon atoms and oxygen atoms. Particularly preferred is a fluorinated organic solvent selected from the group consisting of the fluorinated alkane, the fluorinated aromatic compound and the fluoroalkyl ether.

The liquid medium preferably contains at least one organic solvent selected from the group consisting of the fluorinated alkane, the fluorinated aromatic compound and the fluoroalkyl ether, as fluorinated organic solvents, the compound composed solely of hydrogen atoms, carbon atoms and oxygen atoms, as a non-fluorinated organic solvent, in a total amount of at least 90 mass %, based on the entire medium with a view to increasing the solubility of the fluorinated organic compound.

The content of the liquid medium in the coating liquid is preferably from 90 to 99.999 mass %, particularly preferably from 99 to 99.99 mass %.

The coating liquid may contain other components in addition to the fluorinated organic compound and the liquid medium, within a range not to impair the effects of the present invention.

Such other components may, for example, be known additives such as an acid catalyst or a basic catalyst, which promotes hydrolysis of the hydrolyzable silyl group and a condensation reaction. The acid catalyst may, for example, be hydrochloric acid, nitric acid, acetic acid, sulfuric acid, phosphoric acid, sulfonic acid, methanesulfonic acid or p-toluenesulfonic acid. The basic catalyst may, for example, be sodium hydroxide, potassium hydroxide or ammonia.

In the coating liquid, the content of other components is preferably at most 10 mass %, particularly preferably at most 1 mass %.

The solid content concentration of the coating liquid is preferably from 0.001 to 10 mass %, particularly preferably from 0.01 to 1 mass %. The solid content concentration of the coating liquid is a value calculated from the mass of the coating liquid before heating and the mass after the coating liquid is heated by a convection dryer at 120° C. for 4 hours.

As a method of applying the coating liquid in the present invention, a known method may be employed, such as a spin coating method, a wipe coating method, a spray coating method, a squeeze coating method, a dip coating method, a die coating method, an ink jet method, a flow coating method, a roll coating method, a casting method, a Langmuir-Blodgett method or a gravure coating method.

The drying method may be any known method so long as the liquid medium can be dried and removed. The drying temperature is preferably from 10 to 300° C., particularly preferably from 20 to 200° C.

Introduction of the fluorinated organic groups does not substantially influence the pores, the number of open pores on the outermost surface and the arithmetic mean roughness, however, can adjust the water contact angle to be at least 90°, preferably 100°, particularly preferably at least 110°.

[Application of Substrate with Antireflection Layer]

The substrate with an antireflection layer of the present invention may be attached to the entire surface of a display member of a display device such as a display or a touch panel. Further, it may also be preferably used for an application in which industrial low reflection glass is used, such as applications to vehicles and buildings.

EXAMPLES

Now, the present invention will be described in further detail with reference to Examples. However, it should be understood that the present invention is by no means restricted to such specific Examples.

Ex. 1 to 5 relate to preparation of a particle dispersion, a matrix precursor solution, a coating fluid, a glass plate with a silica porous film and a fluorinated organic compound, Ex. 6 and 7 are Examples of the present invention, and Ex. 8 to 10 are Comparative Examples.

Measurement methods and evaluation methods used in Ex. are shown below.

[Measurement Method]

(Average Primary Particle Size of Particle Dispersion)

A particle dispersion was diluted to 0.1 mass % with water and sampled on a collodion film, 100 particles (B) were randomly selected by observation with a transmission electron microscope (manufactured by Hitachi Ltd., model: H-9000), diameters of the particles were measured, and the obtained average was taken as the average primary particle size of the particles of the particle dispersion.

(Mass Average Molecular Weight of Matrix Precursor (A))

A matrix precursor (A) was diluted to 0.5% with tetrahydrofuran, and the mass average molecular weight was measured by a high performance GPC apparatus (manufactured by TOSOH CORPORATION, model: HLC-8320GPC)

(Anti reflection layer average thickness, outermost surface average thickness)

Each of the antireflection layer average thickness and the outermost surface average thickness of a glass plate with an antireflection layer was obtained as follows. The respective thicknesses were measured at 100 portions from images of the cross-sections of the entirely film-formed portion and the outermost thin film portion containing no voids nor pores of the prepared glass plate with a silica porous film observed with a scanning electron microscope SEM (manufactured by Hitachi Ltd., model: S-4300), and their averages were calculated.

(Pores Having Diameter of at Least 20 nm)

The number of pores having diameters of at least 20 nm in an antireflection layer of a glass plate with an antireflection layer, was obtained by counting the number of pores having diameters of at least 20 nm present in a region of 100 nm×100 nm of an image of the cross-section of the prepared glass plate with a silica porous film observed with a scanning electron microscope SEM (manufactured by Hitachi Ltd., model: S-4300).

(Number of Open Pores on Outermost Surface)

The number of open pores on the outermost surface of an antireflection layer of a glass plate with an antireflection layer was obtained by counting the number of open pores having diameters of at least 20 nm present in a region of 1,000 nm×1,000 nm of an image observed with a scanning electron microscope SEM (manufactured by Hitachi Ltd., model: S-4300).

(Refractive Index)

The refractive index of an antireflection layer of a glass plate with an antireflection layer was measured by an ellipsometer (manufactured by J. A. Woollam, model: M-2000DI) at a wavelength of 589.3 nm. At the time of measurement, the rear side of the glass plate was painted black so as to prevent back side light reflection of the glass plate.

(Water Contact Angle)

A substrate was held horizontally, 5 drops of water, about 2 µL each, were placed on the surface, and the contact angles were measured and the average of the five values was obtained. The larger the water contact angle, the more excellent the water repellency.
(Arithmetic Mean Roughness (Sa))

The arithmetic mean roughness (Sa) of the outermost surface of a glass plate with an antireflection layer was measured with a scanning probe microscope (manufactured by SII NanoTechnology Inc., SPA400DFM) with a measurement range of 10 µm×10 µm.
(Fingerprint Stain Removability)

An artificial fingerprint liquid (a liquid composed of oleic acid and squalene) was deposited on a flat surface of a silicon rubber stopper, and then, excess oil was wiped off with a non-woven fabric (BEMCOT-3: manufactured by Asahi Kasei Corporation) to prepare a fingerprint stamp. On the outermost surface of a glass plate with an antireflection layer, the fingerprint stamp was placed and pressed under a load of 1 kg for 10 seconds. At that time, the haze at the portion where the fingerprint was stamped, was measured by a haze meter (manufactured by Toyo Seiki Co., Ltd.). The value at that time was taken as the initial value. Then, at the portion where the fingerprint was stamped, by means of a reciprocating traverse tester (manufactured by KNT) having tissue paper attached, wiping was carried out under a load of 500 g. The haze value was measured after every wiping reciprocation, and a case where the haze reached 0.5% or lower within 10 wiping reciprocations was evaluated as ○ (favorable), and a case where the haze exceeded 0.5% was evaluated as x (poor).
(Element Number Ratio F/Si of Fluorine Atoms to Silicone Atoms)

With respect to a glass plate with an antireflection layer, with a scanning X-ray photoelectron spectrometer (ESCA, Quantera SXM, manufactured by ULVAC-PHI, Inc.), X-ray measurement was carried out (AlKα ray), and the ratio of the $F_{1s}$ peak height to the $Si_{2p}$ peak height was calculated as the element number ratio F/Si.

Preparation Method

Preparation of Particle Dispersion, Etc.

Ex. 1-1

Preparation of Liquid (1)

5 g of polyethylene oxide (molecular weight: 1,000,000) was dissolved in 95 g of water to obtain polyethylene oxide solution (1). The solid content concentration (mass %) of the obtained solution is shown in Table 1.

Ex. 1-2 and 1-3

Preparation of Particle Dispersions (2) and (3)

Sodium dodecyl sulfate (SDS) and water were put in a glass reactor having a capacity of 200 mL and stirred. Then, methyl methacrylate (MMA) was added, and the mixture was stirred and emulsified. Then, ammonium persulfate (APS) as a polymerization initiator was added, and the mixture was heated to 70° C. and held for one hour to obtain particle dispersion (2) or (3). The amount of use, and the solid content concentration (mass %), the material of particles and the average primary particle size (nm) of each obtained particle dispersion, are shown in Table 1. PMMA represents poly(methyl methacrylate).

Solution (1), particle dispersion (2) and particle dispersion (3) in Table 1 will be hereinafter referred to as particle dispersion or the like.

TABLE 1

|  |  | Ex. 1-1 Solution (1) | Ex. 1-2 Particle dispersion (2) | Ex. 1-3 Particle dispersion (3) |
|---|---|---|---|---|
| Amount (g) | SDS | — | 1 | 0.25 |
|  | Water | — | 93.91 | 94.66 |
|  | MMA | — | 5 | 5 |
|  | APS | — | 0.09 | 0.09 |
|  | Total | — | 100 | 100 |
| Solid content concentration (mass %) |  | 5 | 5 | 5 |
| Material of particles |  | Polyethylene oxide | PMMA | PMMA |
| Average primary particle size (nm) |  | — | 15 | 75 |

Preparation of Matrix Precursor Solution

Ex. 2-1 and 2-2

Preparation of Matrix Precursor Solutions (1) and (2)

The materials as identified in Table 2 were mixed and dissolved to prepare a material solution. The material solution was heated to 25° C. and stirred for one hour to carry out hydrolysis to obtain matrix precursor solution (1) or (2). The solid content concentration (solid content concentration as calculated as $SiO_2$), the acid concentration and the molar ratio ((a1)/(a2)) of each precursor solution are shown in Table 2.

In Table 2, AP-1 represents Solmix AP-1 (ethanol: 85.5 mass %, isopropanol (IPA): 13.4 mass %, methanol: 0.1 mass %, water: 0.2 mass %) manufactured by Japan Alcohol Trading Co., Ltd., $HNO_3$ aq. represents a 10 mass % aqueous nitric acid solution, TEOS represents tetraethoxysilane, PTMS represents phenyltrimethoxysilane, TMOS represents tetramethoxysilane and MTMS represents methyltrimethoxysilane.

TABLE 2

|  |  | Ex. 2-1 Matrix precursor solution (1) | Ex. 2-2 Matrix precursor solution (2) |
|---|---|---|---|
| Amount (g) | AP-1 | 81.58 | 80.74 |
|  | Water | 11.31 | 11.31 |
|  | $HNO_3$aq | 0.54 | 0.54 |
| Compound (a1) | TEOS | 4.58 | 3.05 |
| Compound (a2) | MTMS | 1.99 | 0 |
|  | PTMS | 0 | 4.36 |
|  | Total | 100 | 100 |
| Solid content concentration (mass %) |  | 2.2 | 2.2 |
| Acid concentration (mass %) |  | 0.054 | 0.054 |
| Molar ratio ((a1)/(a2)) |  | 1.5 | 0.67 |

Preparation of Coating Fluid

Ex. 3-1 to 3-3

Preparation of Coating Fluids (1) to (3)

The precursor dispersion or the like and the matrix precursor solution were mixed in a formulation as identified in Table 3 to prepare coating fluids (1) to (3).

TABLE 3

| | | Ex. 3-1 Coating fluid (1) | Ex. 3-2 Coating fluid (2) | Ex. 3-3 Coating fluid (3) |
|---|---|---|---|---|
| Particle dispersion or the like | Type | (1) | (2) | (3) |
| | Amount (g) | 5.5 | 6 | 7 |
| Matrix precursor solution | Type | (1) | (1) | (2) |
| | Amount (g) | 4.5 | 6 | 3 |

Preparation of Glass Plate with Silica Porous Film

Ex. 4-1 to 4-3

Preparation of Glass Plates (1) to (3) with Silica Porous Film

Each of coating fluids (1) to (3) obtained in Ex. 3-1 to 3-3 was applied to the surface of a glass plate (soda lime glass, manufactured by Asahi Glass Company, Limited, size: 100 mm×100 mm, thickness: 3.2 mm) by spin coating (at 500 rpm for 20 seconds) and heated at 650° C. for 5 minutes to obtain glass plates (1) to (3) with a silica porous film.

Ex. 4-4

Preparation of Glass Plate (4) with Silica Porous Film

Into a glass reactor having a capacity of 200 mL, 60 g of ethanol, 30 g of ZnO fine particle aqueous dispersion sol (manufactured by SAKAI CHEMICAL INDUSTRY CO., LTD., tradename: NANOFINE-50, average primary particle size: 20 nm, average aggregated particle size: 100 nm, concentration as calculated as solid content: 10 mass %) and 10 g of tetraethoxysilane (concentration as calculated as $SiO_2$: 29 mass %) were added, the resulting mixture was adjusted to have pH=10 with an aqueous ammonia solution, and the mixture was stirred at 20° C. for 6 hours to obtain 100 g of a core-shell fine particle dispersion (solid content concentration: 6%).

Then, to the obtained core-shell fine particle dispersion, 100 g of a strongly acidic cation exchange resin (manufactured by Mitsubishi Chemical Corporation, tradename: DIAION, total ion exchange capacity: at least 2.0 (meq/mL)) was added, followed by stirring for one hour, and after the pH of the mixture reached 4, the strongly acidic cation exchange resin was removed by filtration to obtain 100 g of a hollow $SiO_2$ fine particle dispersion. Of the $SiO_2$ hollow particles, the thickness of the outer shell was 10 nm, and the pore size was 20 nm. The $SiO_2$ fine particles were aggregated particles, and the average aggregated particle size was 100 nm.

Then, 0.7 g (solid content concentration: 15 mass %) of the obtained hollow $SiO_2$ fine particle dispersion, 2 g (solid content concentration: 2.25 mass %) of a nitrate partial hydrolysate of tetraethoxysilane and 7.3 g of isopropanol were mixed at room temperature to prepare coating liquid 1. The ratio of the hollow silica particles to the matrix component contained in coating liquid 1 was 7:3 (mass ratio) as calculated as $SiO_2$.

Then, the surface of a green glass plate (manufactured by Asahi Glass Company, Limited, tradename: UVFL) having a thickness of 3.5 mm was polished with cerium oxide fine particles, then washed with water and then dried. Coating liquid 1 was applied to the surface by spin coating and dried in a circulating hot air oven at 200° C. for 5 minutes and then fired in a muffle furnace at 600° C. for 5 minutes to prepare glass plate (4) with a silica porous film.

Preparation of Fluorinated Organic Compound

Ex. 5

Synthesis of Compound (10i)

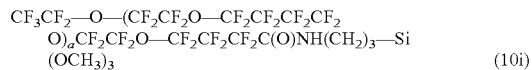

(a is an integer of from 4 to 10, and the average of a is 7)

Into a 300 mL three-necked round-bottom flask, 14.1 g of sodium borohydride was put, and 350 g of AK-225 (tradename, manufactured by Asahi Glass Company, Limited) was added. The mixture was stirred under cooling in an ice bath, and in a nitrogen atmosphere, a solution having 100 g of a compound (11), 15.8 g of methanol and 22 g of AK-225 mixed was slowly dropped from a dropping funnel so that the internal temperature would not exceed 10° C.

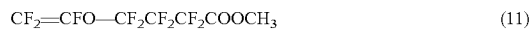

After the entire solution was dropped, a solution having 10 g of methanol and 10 g of AK-225 mixed was further dropped. Then, the ice bath was removed, and the mixture was stirred while the temperature was slowly increased to room temperature. The mixture was stirred at room temperature for 12 hours and then cooled in an ice bath again, and an aqueous hydrochloric acid solution was dropped until the mixture became acidic. After completion of the reaction, the mixture was washed with water once and with a saturated sodium chloride solution once, and the resulting organic phase was recovered and dried over magnesium sulfate, the solid content was removed by filtration through a filter, and the filtrate was concentrated by an evaporator. The recovered concentrated liquid was distilled under reduced pressure to obtain 80.6 g (yield: 88%) of compound (12):

NMR spectra of compound (12):
$^1$H-NMR (300.4 MHz, solvent: deuterated chloroform, standard: TMS) δ(ppm): 2.2 (1H), 4.1 (2H).
$^{19}$F-NMR (282.7 MHz, solvent: deuterated chloroform, standard: $CFCl_3$) δ(ppm): −85.6 (2F), −114.0 (1F), −122.2 (1F), −123.3 (2F), −127.4 (2F), −135.2 (1F).

Into a 100 mL eggplant flask connected to a reflux condenser, 6.64 g of trifluoroethanol was put, and 7.32 g of potassium carbonate was added. In a nitrogen atmosphere, 19.87 g of compound (12) was added with stirring at 75° C., and the mixture was stirred for one hour. Then, the mixture was heated to 120° C., and 113.34 g of compound (12) was slowly dropped while the internal temperature was controlled to be at most 130° C. After the entire amount was dropped, the mixture was stirred further for one hour at 120° C., heating was stopped, and stirring was continued until the temperature reached room temperature. An aqueous hydrochloric acid solution was added to treat excess potassium carbonate, and liquid separation was carried out with water and AK-225. After washing with water three times, the resulting organic phase was recovered and concentrated by an evaporator to obtain an oligomer with a high viscosity. The oligomer was diluted with 150 g of AK-225 and developed and fractionated by silica gel column chromatography (developing solvent: AK-225). With respect to each fraction, an average number of units (a+1) was obtained from the integrated value of $^{19}$F-NMR. 48.5 g of compound (13i) having fractions with an average number of units (a+1) being from 7 to 10 put together, and 13.2 g of compound (13ii) having fractions with an average number of units (a+1) being from 13 to 16 put together, as compounds of the formula (13), were obtained.

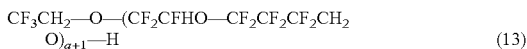
$$CF_3CH_2-O-(CF_2CFHO-CF_2CF_2CF_2CH_2O)_{a+1}-H \quad (13)$$

NMR spectra of compound (13i):
$^1$H-NMR (300.4 MHz, solvent: deuterated acetone, standard: TMS) δ(ppm): 4.1 (2H), 4.8 (16H), 6.7 to 6.9 (8H).
$^{19}$F-NMR (282.7 MHz, solvent: deuterated acetone, standard: CFCl$_3$) δ(ppm): −74.2 (3F), −84.3 to −85.1 (16F), −89.4 to −90.5 (16F), −120.2 (14F), −122.0 (2F), −126.6 (14F), −127.0 (2F), −145.1 (8F).
Average number of units (a+1): 8

NMR spectra of compound (13ii):
$^1$H-NMR (300.4 MHz, solvent: deuterated acetone, standard: TMS) δ(ppm): 4.1 (2H), 4.8 (28H), 6.7 to 6.9 (14H).
$^{19}$F-NMR (282.7 MHz, solvent: deuterated acetone, standard: CFCl$_3$) δ(ppm): −74.2 (3F), −84.3 to −85.1 (28F), −89.4 to −90.5 (28F), −120.2 (26F), −122.0 (2F), −126.6 (26F), −127.0 (2F), −145.1 (14F).
Average number of units (a+1): 14

Into a 300 mL eggplant flask connected to a reflux condenser, 113.33 g of compound (13i), 5.0 g of sodium fluoride and 150 g of AK-225 were introduced, and 84.75 g of compound (14) was added.

$$CF_3CF_2CF_2OCF(CF_3)COF \quad (14)$$

In a nitrogen atmosphere, the mixture was stirred at 50° C. for 13 hours and stirred at 70° C. for 3 hours. Sodium fluoride was removed by a pressure filter, and then, excess compound (14) and AK-225 were distilled off under reduced pressure. By silica gel chromatography (developing solvent: AK-225, highly polar impurities were removed to obtain 100.67 g (yield: 80%) of compound (15i) having an average number of units (a+1) being 8 in the following formula (15).

$$CF_3CH_2-O-(CF_2CFHO-CF_2CF_2CF_2CH_2O)_{a+1}-C(O)CF(CF_3)OCF_2CF_2CF_3 \quad (15)$$

NMR spectra of compound (15i):
$^1$H-NMR (300.4 MHz, solvent: deuterated chloroform, standard: TMS) δ(ppm): 4.4 (16H), 4.9 (2H), 6.0-6.2 (8H).
$^{19}$F-NMR (282.7 MHz, solvent: deuterated chloroform, standard: CFCl$_3$) δ(ppm): −75.2 (3F), −80.0 (1F), −81.9 (3F), −82.7 (3F), −84.7 to −85.0 (16F), −86.0 (1F), −90.5 to −93.0 (16F), −121.1 (2F), −121.5 (14F), −128.0 (16F), −130.3 (2F), −132.5 (1F), −145.3 (8F).
Average number of units (a+1): 8

An autoclave (made of nickel, internal capacity: 1 L) was provided, and at a gas discharge outlet of the autoclave, a condenser held at 0° C., a sodium fluoride pellets-packed layer and a condenser held at −10° C. were set in series. Further, a liquid-returning line to return a liquid condensed from the condenser held at −10° C. to the autoclave, was set. Into the autoclave, 750 g of R-113 was put and stirred while the temperature was maintained at 25° C. After blowing nitrogen gas at 25° C. for one hour into the autoclave, fluorine gas diluted to 20 vol % with nitrogen gas (hereinafter referred to as the 20% fluorine gas), was blown into it at 25° C. for one hour at a flow rate of 3.2 L/hr. Then, while the 20% fluorine gas was blown at the same flow rate, a solution having 130 g of compound (15i) dissolved in 448 g of R-113, was injected into the autoclave over a period of 22 hours. While the 20% fluorine gas was blown at the same flow rate, the internal pressure of the autoclave was raised to 0.15 MPa (gage pressure). Into the autoclave, 8 mL of a benzene solution containing 0.015 g/mL of benzene in R-113, was injected with heating to 25° C. to 40° C., whereupon the benzene solution injection inlet of the autoclave was closed. After stirring for 20 minutes, 4 mL of the benzene solution was injected again while the temperature was maintained at 40° C., whereupon the injection inlet was closed. The same operation was further repeated 7 times. The total injection amount of benzene was 0.6 g. Stirring was continued for one hour while the 20% fluorine gas was blown at the same flow rate. The internal pressure of the autoclave was adjusted to the atmospheric pressure, and nitrogen gas was injected for one hour. The content in the autoclave was concentrated by an evaporator to obtain 152.1 g (yield: 99%) of compound (16i) having an average number of units (a) being 7 in the following formula (16).

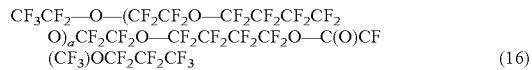
$$CF_3CF_2-O-(CF_2CF_2O-CF_2CF_2CF_2O)_aCF_2CF_2O-CF_2CF_2CF_2O-C(O)CF(CF_3)OCF_2CF_2CF_3 \quad (16)$$

NMR spectra of compound (16i):
$^{19}$F-NMR (282.7 MHz, solvent: deuterated chloroform, standard: CFCl$_3$) δ(ppm): −80.0 (1F), −82.0 to −82.5 (6F), −84.0 (30F), −86.7 to 87.8 (6F), −89.2 (34F), −126.5 (32F), −130.4 (2F), −132.4 (1F).
Average number of units (a): 7

Into a 500 mL PFA round-bottomed flask, 120 g of compound (16i) and 240 g of AK-225 were introduced. The mixture was stirred under cooling in an ice bath, 6.1 g of methanol was slowly dropped from a dropping funnel in a nitrogen atmosphere. While bubbling with nitrogen, the mixture was stirred for 12 hours. The reaction mixture was concentrated by an evaporator to obtain 108.5 g (yield: 100%) of compound (17i) having an average number of units (a) being 7 in the following formula (17).

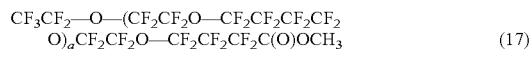
$$CF_3CF_2-O-(CF_2CF_2O-CF_2CF_2CF_2O)_aCF_2CF_2O-CF_2CF_2CF_2C(O)OCH_3 \quad (17)$$

NMR spectra of compound (17i):
$^1$H-NMR (300.4 MHz, solvent: deuterated chloroform, standard: TMS) δ(ppm): 3.9 (3H).
$^{19}$F-NMR (282.7 MHz, solvent: deuterated chloroform, standard: CFCl$_3$) δ(ppm): −84.0 (30F), −88.2 (3F), −89.2 (34F), −119.8 (2F), −126.5 (30F).
Average number of units (a): 7

Into a 300 mL eggplant flask, 92.5 g of compound (17i) and 6.51 g of compound (18) were put, followed by stirring for 12 hours. It was confirmed by NMR that 98% of compound (17i) was converted to compound (10i). Further, the entire compound (18) was reacted, and methanol as a by-product was formed. In such a manner, a composition containing 97% of compound (10i) having an average number of units (a) being 7 in the following formula (10)

was obtained. The number average molecular weight (Mn) of compound (10i) was 2,900.

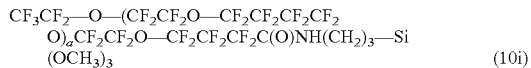

wherein a is an integer of from 4 to 10, and an average of a is 7.

NMR spectra of compound (10i):

$^1$H-NMR (300.4 MHz, solvent: deuterated chloroform, standard: TMS) δ(ppm): 0.6 (2H), 1.6 (2H), 2.8 (1H), 3.3 (2H), 3.5 (9H).

$^{19}$F-NMR (282.7 MHz, solvent: deuterated chloroform, standard: CFCl$_3$) δ(ppm): −84.1 (30F), −87.9 (3F), −89.3 (34F), −120.8 (2F), −126.6 (28F), −127.2 (2F).

Preparation of Glass Plate with Antireflection Layer

Ex. 6 to 10

Fluorinated organic compound (10i) prepared in Ex. 5 was dissolved in Novec-7200 (manufactured by Sumitomo 3M Limited) as a medium to prepare a coating liquid having a solid content concentration of 0.05%. A glass plate with a silica porous film was dipped in the coating liquid (dip coating method), left to stand for 30 minutes and then pulled out. The substrate was dried at 200° C. for 30 minutes and washed with AK-225 to obtain a glass substrate with an antireflection layer. Physical properties measured are shown in Table 4. In Table 4, DSX represents Optool DSX (manufactured by Daikin Industries, Ltd.).

The fingerprint stain removability in Ex. 9 and 10 was not evaluated since the water contact angle was low, the element number ratio F/Si was less than 1, and the antifouling property was insufficient.

The glass plate with an antireflection layer prepared in each of Ex. 6 and 7 has a low refractive index. It has a high water contact angle and an element number ratio F/Si of at least 1, and is thereby excellent in the antifouling property. It is also excellent in the fingerprint stain removability.

Whereas, the glass plate with an antireflection layer prepared in Ex. 8 is insufficient in the fingerprint stain removability. It is considered that since the arithmetic mean roughness was more than 3 nm, the fingerprint stain was embedded in the surface of the antireflection layer and could not be removed.

The glass plate with an antireflection layer prepared in Ex. 9 has a low water contact angle and an element number ratio F/Si of less than 1 and is thereby insufficient in the antifouling property.

The glass plate with an antireflection layer prepared in Ex. 10 has a low water contact angle and an element number ratio F/Si of less than 1 and is thereby insufficient in the antifouling property.

INDUSTRIAL APPLICABILITY

According to the present invention, it is possible to provide a substrate with an antireflection layer not only which is excellent in the antireflection properties but also which has excellent water repellency and oil repellency and excellent fat and oil stain removability, and a display device provided with a substrate with an antireflection layer.

This application is a continuation of PCT Application No. PCT/JP2014/060751, filed on Apr. 15, 2014, which is based upon and claims the benefit of priority from Japanese Patent Application No. 2013-091568 filed on Apr. 24, 2013. The contents of those applications are incorporated herein by reference in their entireties.

REFERENCE SYMBOLS

10: Substrate with antireflection layer
11: Substrate

TABLE 4

| | | Ex. 6 | Ex. 7 | Ex. 8 | Ex. 9 | Ex. 10 |
|---|---|---|---|---|---|---|
| Glass plate with silica porous film | | (3) | (3) | (4) | (1) | (2) |
| Fluorinated compound | | (10i) | DSX | (10i) | (10i) | (10i) |
| Antireflection layer average thickness (nm) | | 157 | 157 | 150 | 100 | 115 |
| Outermost surface average thickness (nm) | | 30 | 30 | 0 | N/A | 10 |
| Pores having diameter of at least 20 nm | | 2 | 2 | 1 | 0 | 16 |
| Number of open pores on outermost surface | | 0 | 0 | 182 | 0 | 0 |
| Refractive index | | 1.21 | 1.21 | 1.35 | 1.38 | 1.25 |
| Water contact angle | Glass plate with silica porous film | 9.5–39.9 | 9.5–39.9 | 26 | 68 | 66.8 |
| | Glass plate with antireflection layer | 115.1 | 112.8 | 126.5 | 101.5 | 103.1 |
| Arithmetic mean roughness (Sa) | | 1.589/2.574 (Two samples measured) | 1.589/2.574 (Two samples measured) | 7.638 | 2.47 | 4.557 |
| Fingerprint stain removability | | ○ | ○ | × | Not measured | Not measured |
| Element number ratio F/Si | | 4.1 | 3.8 | 5.6 | 0.2 | 0.6 |

12: Antireflection layer
14: Silica porous film
22: Pore
a: Antireflection layer average thickness
d: Outermost surface average thickness
What is claimed is:

1. A substrate with an antireflection layer, which comprises an antireflection layer on at least one surface of the substrate, wherein:
   the antireflection layer comprises a silica porous film and a coating having fluorinated organic groups;
   the surface of the antireflection layer on the opposite side from the substrate has an element number ratio F/Si of at least 1 as obtained from the peak height of $F_{1s}$ and the peak height of $Si_{2p}$ in surface analysis by scanning X-ray photoelectron spectroscopy (ESCA) and has an arithmetic mean roughness (Sa) of at most 3.0 nm;
   the silica porous film has pores having diameters of at least 20 nm, and has a number of open pores of at most 13 pores/$10^6$ nm$^2$ on the opposite surface of the antireflection layer from the substrate;
   the pores are contained in a matrix of the silica porous film; and
   in the antireflection layer, the average of minimum distances from closed pores having diameters of at least 20 nm to the surface of the silica porous film on the opposite side from the substrate, is from 10 to 80 nm.

2. The substrate with an antireflection layer according to claim 1, wherein the antireflection layer has a refractive index of from 1.10 to 1.38.

3. The substrate with an antireflection layer according to claim 1, wherein the silica porous film has a number of open pores of at most 10 pores/$10^6$ nm$^2$ on the opposite surface of the antireflection layer from the substrate.

4. The substrate with an antireflection layer according to claim 1, wherein in the antireflection layer, the average of minimum distances from closed pores having diameters of at least 20 nm to the surface of the silica porous film on the opposite side from the substrate, is from 13 to 60 nm.

5. The substrate with an antireflection layer according to claim 1, wherein in the silica porous film, the average diameter of the pores is from 15 to 100 nm.

6. The substrate with an antireflection layer according to claim 1, wherein the thickness of the antireflection layer is from 90 to 260 nm.

7. The substrate with an antireflection layer according to claim 1, wherein the matrix of the silica porous film comprises silica as the main component.

8. The substrate with an antireflection layer according to claim 1, wherein the coating has the fluorinated organic groups on the surface of the antireflection layer on the opposite side from the substrate.

9. The substrate with an antireflection layer according to claim 8, wherein the fluorinated organic groups are groups derived from a compound having a poly(oxyperfluoroalkylene) chain and a hydrolysable silyl group.

10. The substrate with an antireflection layer according to claim 9, wherein:
    the compound is a compound represented by the following formula (1):

$$A\text{-}O\text{-}R^f\text{-}B \quad (1);$$

$R^f$: is poly(oxyperfluoroalkylene) chain;
    A: is a $C_{1-6}$ perfluoroalkyl group or B;
    B: is a group represented by the following formula (2):

$$\text{-}Q\text{-}Si\text{-}L_m R_{3-m} \quad (2);$$

Q: is a bivalent linking group;
    L: is a hydrolysable group;
    R: is a hydrogen atom or a monovalent hydrocarbon group; and
    m: is an integer of from 1 to 3.

11. The substrate with an antireflection layer according to claim 1, wherein the substrate is a transparent substrate.

12. A display device provided with the substrate with an antireflection layer as defined in claim 1.

13. A method for producing the substrate of claim 1, the method comprising:
    forming the silica porous film on the at least one surface of the substrate; and
    treating the surface of the silica porous film with a compound having a poly(oxyperfluoroalkylene) chain and a hydrolysable silyl group to form the coating having the fluorinated organic groups which has an element number ratio F/Si of at least 1 as obtained from the peak height of $F_{1s}$ and the peak height of $Si_{2p}$ in surface analysis by scanning X-ray photoelectron spectroscopy (ESCA) and has an arithmetic mean roughness (Sa) of at most 3.0 nm.

14. The method for producing a substrate with an antireflection layer according to claim 13, wherein the silica porous film is a film having a plurality of pores in a matrix containing silica as the main component.

15. The method for producing a substrate with an antireflection layer according to claim 14, wherein the silica porous film is formed on the substrate by forming a precursor layer containing a matrix precursor (A) containing at least one compound (A1) selected from a compound represented by the following formula (a1), its hydrolysate and partial condensate, and at least one compound (A2) selected from a compound represented by the following formula (a2), its hydrolysate and partial condensate, and particles (B) which can be removed from the matrix by heating, followed by heating:

$$SiX^1_4 \quad (a1)$$

$$Y_n SiX^2_{4-n} \quad (a2)$$

wherein each of $X^1$ and $X^2$ is a hydrolysable group, Y is a non-hydrolysable group, and n is an integer of from 1 to 3.

* * * * *